United States Patent [19]
Dahlen et al.

[11] 4,226,910
[45] Oct. 7, 1980

[54] ENERGY CONTROL SHEET HAVING INSULATIVE PROPERTIES

[75] Inventors: Richard R. Dahlen, White Bear Lake, Minn.; Richard L. Hansen, West Chester, Pa.; Richard L. Weiher, Hudson, Wis.

[73] Assignee: Minnesota Mining and Manufacturing Company, St. Paul, Minn.

[21] Appl. No.: 56,905

[22] Filed: Jul. 12, 1979

Related U.S. Application Data

[63] Continuation-in-part of Ser. No. 867,321, Jan. 5, 1978, abandoned.

[51] Int. Cl.$^3$ .................... B32B 17/10; B32B 15/08
[52] U.S. Cl. .................... 428/336; 52/309.14; 52/309.15; 52/789; 350/1.3; 350/1.4; 350/166; 350/316; 428/334; 428/335; 428/339; 428/426; 428/430; 428/433; 428/457; 428/458; 428/461; 428/463; 428/480; 428/910; 428/918
[58] Field of Search ............... 428/430, 426, 457, 458, 428/480, 918, 910, 433, 461, 463, 336, 335, 334, 339; 350/1.3, 1.4, 166, 316; 52/309.14, 309.15, 789, 811, 615, 616

[56] References Cited

U.S. PATENT DOCUMENTS

| 3,290,203 | 12/1966 | Antonson | 428/430 |
| 3,775,226 | 11/1973 | Windorf | 428/430 |
| 3,776,805 | 12/1973 | Hanson | 428/458 |
| 3,891,486 | 6/1975 | Willdorf | 428/430 |
| 3,949,134 | 4/1976 | Willdorf | 428/430 |
| 4,095,013 | 6/1978 | Burger | 428/918 |
| 4,158,718 | 6/1979 | Kehl | 428/461 |

FOREIGN PATENT DOCUMENTS 1242430 11/1959 France .

OTHER PUBLICATIONS

*American Institute of Physics Conf. Proc.*, #25, 1975, N.Y. 286-299.

Primary Examiner—Ellis P. Robinson
Attorney, Agent, or Firm—Cruzan Alexander; Donald M. Sell; Richard E. Brink

[57] ABSTRACT

Composite energy control sheet of the type wherein a transparent-reflective metal layer is coated on a self-supporting transparent polymeric foil and protectively covered with a transparent polymeric layer. The protective polymeric layer is chosen to transmit 80% or more of the normal room temperature radiant energy spectrum (about 4-40 micrometer wavelength) so that when the energy control sheet is positioned adjacent (but other than outside of) a glazing unit and oriented so that the protective layer does not contact any face of the glazing unit, heat loss from the room is significantly decreased and the cold weather performance of the sheet is greatly improved. Among the suitable polymers for the polymeric layer are polyethylene, polypropylene and polyacrylonitrile.

12 Claims, 3 Drawing Figures

ENERGY CONTROL SHEET HAVING INSULATIVE PROPERTIES

CROSS REFERENCE TO RELATED APPLICATION

This application is a continuation-in-part of our co-pending application Ser. No. 867,321, filed Jan. 5, 1978 now abandoned.

BACKGROUND OF THE INVENTION

This invention relates to composite energy control sheets and to window units incorporating such sheets.

For at least the past several decades many people have striven to develop a window cover or shade which would allow sunlight's visible wave lengths (0.4–0.7 micrometer) to pass through a glazed window into a room but which would simultaneously reduce glare and exclude sunlight's heat-generating near infrared wave lengths (0.7–2.5 micrometers). Lion, U.S. Pat. No. 2,774,021, for example, discloses a window shade in which a transparent or translucent self-supporting cellulosic foil is coated with a transparent-reflective layer of metal on the side adjacent the window, a protective layer of varnish or the like optionally being applied over the metal layer to reduce corrosion or mechanical damage. Subsequent refinements of Lion's window unit (i.e., windowpane plus shade) have included inner storm windows, where the solar control sheet is sealed or attached to the window frame to provide a dead air space between the glass and the shade.

Antonson et al, U.S. Pat. No. 3,290,203 describes and claims a window unit in which a transparent foil (especially a polyester foil) is provided with a transparent-reflective metal layer on one face, the metal layer being covered by a transparent protective layer which in turn in adhered to the inside of a conventional windowpane. This type of window unit, which is simple, compact and convenient, has been found more effective than the Lion window unit in blocking the entry of solar-generated near infra-red energy into a room. The transparent protective layer may be either a coating or, if desired, a second polyester foil adhered in place, as is shown in, e.g., Windorf, U.S. Pat. No. 3,775,226; in the latter case, either of the two polyester foils may be adhered to the windowpane. The adhesive which bonds the solar control sheet to the windowpane may be water-soluble (cf. the aforementioned Antonson et al patent), pressure-sensitive, pressure-sensitive but water-activatable (c.f. Theissen, U.S. Pat. 3,681,179), or of a "cling" nature (cf. Burger, U.S. Pat. 4,095,013).

As will be apparent from the foregoing discussion, work in the solar energy control sheet art has been almost exclusively concerned with keeping sunlight's heat and glare from affecting the comfort of those inside a room, hence, energy control sheets have been most widely used in those geographical areas where the outside temperature rarely falls below 0° C. Studies have shown, however, that windows not only contribute heavily to high air conditioning energy usage in the summer but also contribute significantly to high heating costs in winter. The thermal conductance (or "U" value*) of a single glazed window typically exceeds 5 kcal/°C. hr. m², whereas a well-insulated wall has a U value less than 0.5 and a well-insulated ceiling has a U value less than 0.2. Thus, heat can be lost through a conventionally glazed window at a rate over an order of magnitude greater than through insulated walls or ceilings. In cold regions, attempts to make the occupants of a room comfortable in winter have usually involved adding external storm windows (which is not always feasible) and drawing opaque drapes across the face of the window, thereby blocking any view of the outside.

*The insulative (or "R" value) is the reciprocal of a "U" value; e.g., a U value of 0.1 is equivalent to an R value of 10. In English units, U is expressed as BTU/°F. hr. ft². In metric units, U is expressed as kcal/°C. hr. m².

Prior to the present invention, those persons in cold countries who occupied rooms where the windows were protected with solar control sheets (especially where such sheets were adhered to the inner surface of a windowpane) often felt cold in winter for at least two reasons. Solar-originating near infra-red energy (0.7–2.5 micrometers) was reflected back outside; additionally, heat inside the room was transferred to the windowpane by radiation and convection and lost to the outside. Nearly half of such loss was caused by internal infra-red energy (wave length range of about 4–40 micrometers) radiating from the skin of room occupants, as well as from the outside of objects in the room, to the solar control sheet, where it was absorbed by the foil adjacent the room, transmitted by conduction to the metalized layer, further conducted to the windowpane and then radiated to the outside. Although there has been a desire to maintain the visual advantages of solar energy control sheets while improving their poor insulative properties, no means for achieving such an objective has previously been provided. Thus, for example, it has been suggested* that the conventional infra-red absorbing polyester foil could be replaced with polyethylene (which is relatively transparent to infra-red rays), but it has been found impractical to apply a metal vapor coating to polyethylene for use in a solar energy control sheet, one or more of such properties as handling, adhesion, reflectivity and optical clarity being unsatisfactory.

*See, e.g., American Institute of Physics Conference Proceedings, No. 25, Efficient Use of Energy, Part III, p. 292, New York, NY, 1975

SUMMARY

The present invention is an improved and surprisingly effective form of energy control sheet. When incorporated into a window unit in the outside wall of a room, this new product not only effectively excludes externally originating heat and glare during the summer but also substantially reduces heat loss from internally originating radiation of infra-red energy during the winter or, indeed, whenever the outside temperature is lower than the inside temperature.

The invention makes it possible to modify a window unit located in the external wall of a room, such units conventionally comprising a plurality of transparent strata including (a) a glazing unit having an inside face oriented toward the interior of the room and an outside face oriented toward the exterior of the room, said glazing unit comprising at least one rigid transparent stratum (or pane) whose inner face coincides with the inside face of the glazing unit, and (b) a flexible, transparent energy control stratum which is located adjacent to* said glazing unit or, in the case of the multi-pane glazing unit, adjacent to either surface of one of its component panes, and which is a flexible, unitary, multi-layer sheet comprising a transparent-reflective metal layer bonded to a transparent polymeric support layer and protectively covered by a transparent polymeric layer. Most (if not all) of the presently commercial solar energy control sheets utilize support layers of polyester foil (biaxially oriented polyethylene terephthalate), which offers the combined advantages of strength, flexibility, clarity and moderate cost. Other polymers which can be made into functional support foils include polyvinyl fluoride, polyvinylidene fluoride, polycarbonates, polystyrene, polymethyl methacrylate, polyimides, polyamides, ionomers, etc., as well as esters and mixed esters of cellulose, stabilizers against degradation caused by ultraviolet light being included where appropriate. Unfortunately, however, all of these polymers have low infra-red radiation transmission properties and high infra-red radiation absorption properties.

*To avoid any misunderstanding, the phrase "adjacent to" as used herein is intended to mean either near to or in contact with.

The improvement lies in making two changes in the energy control stratum, viz., (1) selecting a transparent polymeric protective layer which transmits at least about 80%* of the normal room temperature radiant energy in the wave length of 4 to 40 micrometers and (2) locating the energy control stratum other than adjacent the outside face of the glazing unit and orienting it so that the protective layer does not contact any surface of the glazing unit. As a result of this modification of otherwise conventional energy control sheets and their use, window units of the invention not only effectively exclude externally originating heat and glare but also ensure the retention of most internally originating infrared energy and thereby significantly improve the insulative effectiveness of the window unit in cold weather. The infra-red transmitting polymeric protective layer should be thick enough to afford adequate protection for the metal layer but thin enough to minimize absorption of radiant energy; a range of 5–50 micrometers has been found satisfactory. The protective layer is desirably a polymer of monomers consisting essentially of lower alkylene monomers of acrylonitrile; however, small amounts of other monomers may be copolymerized with the alkylene or acrylonitrile monomers, and small amounts of polymers formed from such other monomers may be blended with the polyalkylene or polyacrylonitrile to improve handling, processing, etc.

*A corollary of the high transmittance is low absorption (corresponding less than 20%).

One effective way to employ the energy control film of the invention is to adhere the support foil to the inside face of a conventional glazing unit. When infrared rays pass from a room through the polymeric protective layer in such an installation, about 85–95% are reflected from the metalized layer back through the protective layer and their heating value thus retained in the room. The polymeric support foil, which in previous solar energy control sheets was located adjacent the room, was quite transparent to the visible spectrum but it transmitted only about 50–60% of the rays in the infra-red spectrum, the remainder being absorbed. Thus, for 100 units of infra-red energy directed toward the inner face of prior art solar control sheets, no more than about 25–30% ($0.90 \times 0.55 \times 0.55$) was actually returned to the room.

Simple and desirable as the invention may appear in retrospect, those working in the solar control sheet art for decades have failed to recognize how it might be arrived at, even though suitable polymeric materials have long been available.

BRIEF DESCRIPTION OF THE DRAWING

In the accompanying drawing, all thicknesses are greatly exaggerated to facilitate understanding.

DESCRIPTION OF PRESENTLY PREFERRED EMBODIMENTS

Figure 1:
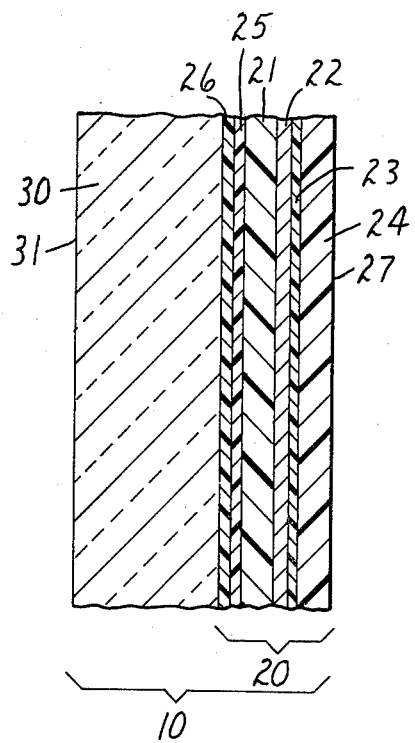
FIG. 1 is a cross-sectional view of a portion of one type of window unit incorporating the present invention.
Figure 2:
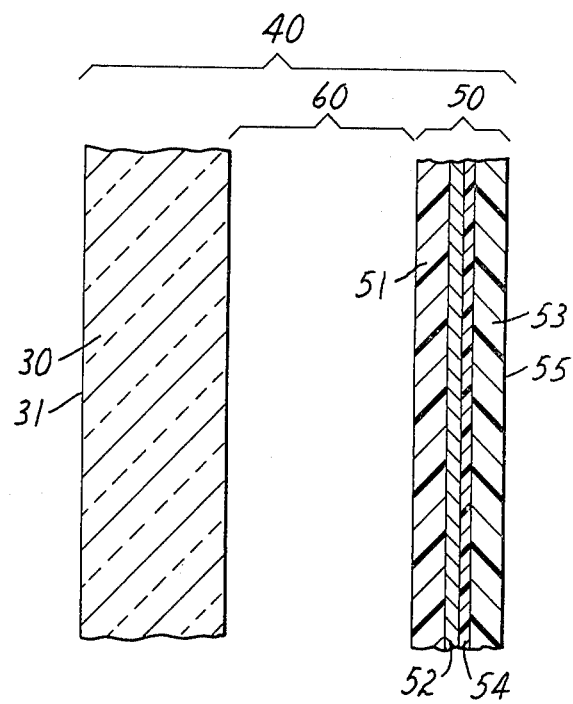
FIG. 2 is a cross-sectional view of a porion of another type of window unit incorporating the invention.

In the drawing, FIG. 1 illustrates a window unit of the type where a composite energy control sheet of the invention is adhered to the inside face of a glazing unit. FIG. 2 depicts a cross-sectional view of a window unit of the type where the composite energy control sheet is located inside the glazing unit but is spaced therefrom. Window units of the latter type include those in which the energy control sheet is either semi-permanently attached to the window frame or mounted on a roller so that it can be moved up and down as necessary. Thus, window units of the type shown in FIG. 2 can have the edges of the energy control sheet mounted in a track at the window edges, sealed to the window frame or held in place with flexible magnets.

Figure 3:
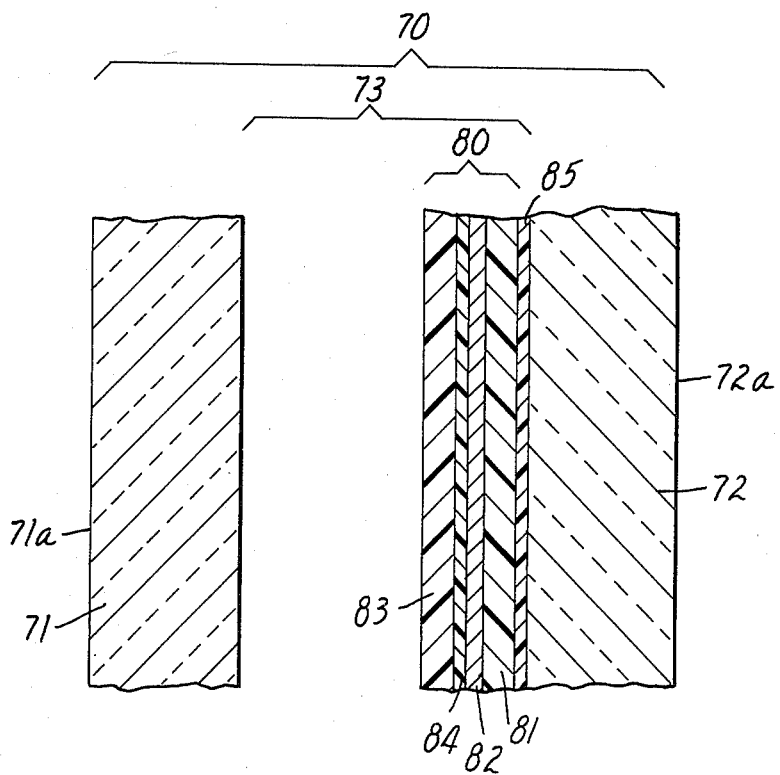
FIG. 3 is a cross-sectional view of a portion of a third type of window unit incorporating the invention.

FIG. 3 shows a hermetically sealed double pane glazing unit in which an energy control film of the invention is adhered to the interior face of one of the panes. Such a mounting procedure, which would normally be carried out during the process of making the glazing unit, offers certain advantages over the window units shown in FIGS. 1 and 2. For example, the thickness of the protective layer can be held to a minimum, there being essentially no danger of physical contact. It has also been found that the pane adjacent the room is maintained at a somewhat higher temperature and hence that condensation of moisture is substantially reduced.

In FIG. 1, window unit 10 comprises composite energy control sheet 20 laminated to the inner face of single-pane glazing unit 30. Energy control sheet 20 comprises polymeric foil support layer 21, to one face of which is bonded transparent-reflective metal layer 22, which may be a vapor deposited layer of aluminum, silver, gold, copper, or any other excellent reflector of radiant energy over the solar and infra-red spectrum, i.e., 0.3–40-micrometer wave length. It has been found that this metal layer should have a sheet resistance of less than 20 ohms/square, and preferably less than 10 ohms/square, in order to possess both adequate transparency to visible light rays and good reflectivity of infra-red rays.

Since a thin metallic coating is subject to corrosion, mechanical abrasion, or both, it is necessary to protect it with a thin polymeric layer 24, which may be applied by extruding, coating, laminating or, preferably, adhering with an extremely thin layer of adhesive 23. Polymeric layer 24 is selected on the basis of both its ability to protect metal layer 22 and its transparency to infrared radiation. The thickness of layer 24 should be at least about 5 micrometers, and preferably at least about 10 micrometers, for adequate abrasion resistance, and when the protective layer is applied by coating from a solvent, 5–15 micrometers is a fairly typical value. When preformed foils of the protective polymeric layer are employed, it is likewise generally desired to employ thicknesses of at least about 5 micrometers (preferably at least about 10 micrometers to facilitate handling), but thicknesses as great as 25–50 micrometers can be employed successfully. It will be appreciated that the less the thickness of protective layer 24, the greater its infra-red transmission. Likewise, of course, the less the thickness of adhesive layer 23, the less its absorption of infra-red energy.

Composite energy control sheet 20 is adhered to the inside face of glazing unit 30 by means of adhesive layer 26, which may be any of those commonly used in the solar control industry today. For example, adhesive layer 26 may be the dried deposit of an aqueous solution of a water-soluble adhesive which is either coated on the inside face of glazing unit 30 just before applying energy control sheet 20 or coated on energy control sheet 20 during manufacture, dried and activated with water before application to glazing unit 30. Similarly, adhesive layer 26 may be normally tacky and pressure-sensitive adhesive or any of the so-called "cling" vinyl adhesives. In order to minimize the deteriorative effect of ultra-violet light on any of the polymer layers in energy control sheet 20, it is highly desirable to interpose a coating 25, containing a UV absorber, between polymer layer 21 and adhesive layer 26; alternatively, a UV absorber may be incorporated in polymer layer 21 or adhesive layer 26.

In normal use, solar radiation is directed toward face 31 of glazing unit 30, passing through glazing unit 30, adhesive layer 26, UV-absorbing layer 25 (if present) and polymeric foil 21. A significant amount of the solar radiation (including rays in both the visible spectrum and the near infra-red spectrum) is then reflected from metal layer 22 back through polymeric foil 21, UV-absorbing layer 25 (if present), adhesive layer 26 and glazing unit 30, thereby reducing the light level, heat and glare inside the room in which window unit 10 is employed. While glare and heat transmission into the room are greatly reduced, sufficient light is transmitted into the room through metal layer 22, adhesive layer 23 (if present) and protective polymeric layer 24 to permit normal activities to be carried on in comfort. Some near infra-red solar energy is absorbed in polymeric foil 21, where it is converted to heat and re-transmitted outside by either conduction or radiation through glazing unit 30.

When the temperature outside window unit 10 falls significantly below the temperature inside the room, different factors come into play. All objects and persons inside a room may be considered to have a surface temperature of approximately 300° K. and hence to function as black body radiators, emitting energy in the infra-red spectrum, covering a wave length of approximately 4–40 micrometers. Because of the temperature difference between the opposite sides of window unit 10, there is then a normal tendency to lose heat from the room by the process of radiation. Such infra-red energy is radiated toward the outside, being directed toward the inner surface 27 of window unit 10, where it passes first through polymeric protective layer 24, encounters transparent-reflective metal layer 22, and is reflected back through polymer protective layer 24 into the room. Since the infra-red rays pass through protective layer 24 twice, the amount of radiant energy which is actually returned to the room is effectively the square of the infra-red transmission of layer 24.

Conventional solar energy control sheets are so mounted on windows that the polymeric support foil confronts the room; since polyester polymers, which are commonly employed as the support foil, have an infra-red transmission value of approximately 0.5–0.6, and since about 10% of the infra-red radiation is absorbed by or transmitted through the metal layer, the amount of energy which is actually returned to the room, when such conventional solar energy control sheets are used, is only about 25-30% of that which is directed toward the window from inside. The balance of the energy is absorbed by the support foil, where it is converted to heat, and transmitted by conduction successively through the metal layer, protective coating, adhesive layer, and glass window-pane, where it is lost to the outside. In contrast, energy control sheets of the present invention are mounted so that protective polymeric layer 27 is adjacent the room and support foil 21 is adjacent glazing unit 30; the protective polymer layers of the present invention are selected to have infra-red transmission values of at least 80%, and preferably 90% or more in the thicknesses employed; at least taking into acount the 85–95% reflectance alluded to above, energy control sheets of the present invention thus return about 55% $(0.85 \times 0.80 \times 0.80)$ of the room-origin infra-red energy to the room.

Attention is now directed to FIG. 2, which, as previously noted, depicts a somewhat different type of arrangement. Window unit 40 comprises glazing unit 30 and composite energy control sheet 50, the latter being located inside but spaced from the inner face of glazing unit 30. Sheet 50 comprises self-supporting polymeric foil 51, over one face of which is bonded transparent-reflective metal layer 52. Protective layer 53, which in this instance is shown as a self-supporting pre-formed polymer foil, is adhered over metal layer 52 by means of adhesive 54. Composite solar control sheet 50 may, and preferably does, incorporate UV-absorbers, as discussed in connection with energy control sheet 20.

Located between glazing unit 30 and composite energy control sheet 50 is air space 60. Solar energy strikes face 31 of glazing unit 30, radiating through air space 60 to composite sheet 50 in substantially the same manner described in connection with FIG. 1. In doing so, the solar-origin infra-red (or near infra-red) energy is absorbed in polymeric foil 51, which is heated thereby. Foil 51 then transfers some of the absorbed heat to the air in space 60 and some to the room by conduction through metal layer 52, adhesive 54 and protective layer 53. If tight peripheral sealing does not exist, additional solar energy escapes from space 60 into the room, an effect which is undesirable in summer but very desirable in winter.

Window unit 40 is more effective in energy conservation than window unit 10 in the winter for yet another reason. When room-origin infra-red energy is directed toward face 55, even that energy which is converted into heat in layer 53 is not so readily transmitted to glazing unit 30 and thence outside; because of the added thermal resistance of air space 60. If glare is of no consequence during winter, it is even possible to move composite sheet 50 out of the way during sunny weather, keeping it in position only during those times when the sun is not shining. On the other hand, a solar energy control sheet mounted in window unit 40 has a greater tendency to impart visual distortion and is more subject to injury than when mounted in window unit 10. Further, as has been previously noted, window unit 40 is less efficient in summer than window unit 10 unless care is taken to provide adequate sealing at the edges.

The foregoing description of window unit 40 has all involved an orientation of energy control sheet 50 such that supporting foil 51 was adjacent to glazing unit 30. So long as energy control sheet 50 is spaced from (i.e., not in contact with) glazing unit 30, it is almost equally satisfactory for protective layer 53 to be adjacent thereto. In such case, the room-originating infra-red energy is directed toward support film 51 where much of it is absorbed and, because of the high transmittance-low absorption characteristics of protective layer 53, and its resultant low emittance surface, re-radiated back to the room. (If, however, protective layer 53 were to be in actual contact with the inside of glazing unit 30, almost all of the absorbed infra-red energy would be conducted to glazing unit 30 and hence lost to the outside.) If energy control sheet 50 is to be oriented in this way, it is desirable to include in protective layer 53 a suitable stabilizer against the effects of solar-origin ultraviolet light.

In FIG. 3, window unit 70 comprises a prefabricated multi-pane glazing unit including glass panes 71 and 72, which are spaced from each other and peripherally hermetically sealed to provide intervening dead air space 73. Bonded to the inner face of pane 72 by adhesive 85 is composite energy control sheet 80, comprising polymeric foil 81, and transparent-reflective metal layer 82, self-supporting protective foil layer 83 being bonded thereover by adhesive 84. Window unit 70 will normally be fabricated during the manufacture of the multi-pane glazing unit by adhering energy control sheet to pane 72 before final assembly.

Window unit 70 may be installed in the wall of a room with either pane 71 or pane 72 facing the room with substantially equal effectiveness in retaining room-originating infra-red energy within the room. The reason for this phenomenon is substantially the same as discussed above in connection with window unit 40.

In the following examples, all parts are by weight unless otherwise noted.

EXAMPLE 1

A 25-micrometer foil of biaxially oriented polyethylene terephthalate was vapor coated with aluminum to a sheet resistance of approximately 9 ohms/square, which resulted in a visible spectrum transmission of approximately 0.18 at 0.55 micrometer wave length. The infra-red reflectance of this surface was measured with a spectrophotometer and found to be 0.85. The normal emittance, measured in accordance with ASTM test C445-61, was found to be 0.12. (Theoretically the sum of the reflectance and emittance values should equal 1.00. It is believed, however, that the emittance is significantly more reliable than the reflectance value and hence that the infra-red reflectance of the aluminized film may be taken to be 0.88.) The aluminized surface was then coated with a 30.5-micron layer of polyethylene having a density of 0.918 and a melt index of 3.0-3.9 g/10 min. at 190° C. (commercially available from Union Carbide under the trade designation "DFD-3300") by a hot extrusion process, after which the reflectance and emittance measurements were repeated and found to be, respectively, 0.74 and 0.24. An extruded 30.5-micron foil of the same polyethylene was found to have an infra-red transmission value of 0.89. The reflectance and emittance values for a conventional solar control sheet of the type in which a 12-25 micrometer layer of biaxially oriented polyethylene terephthalate is employed in the same effective position as the polyethylene in this example, displayed infra-red reflectance and emittance values of, respectively, 0.35 and 0.65.

EXAMPLE 2

On the metalized face of another sample of the aluminized polyester foil employed in Example 1, there was coated a 2% methylethyl ketone solution of 95:5 iso-octyl acrylate:acrylic acid pressure-sensitive adhesive and the solvent evaporated to leave a thin (approximately 0.9-micrometer) layer of adhesive weighing 1.08 g/m². A 12.7-micrometer foil of biaxially oriented isotactic polypropylene which had been subjected to corona treatment was then bonded to the adhesive-coated surface using a pair of squeeze rolls at room temperature. Prior to lamination, the polypropylene foil had an infra-red transmission value of 0.92, and the normal emittance of the laminate was found to be 0.25.

Using the data contained in a U.S. Government report entitled "Residential Energy Consumption, Single Family Housing", it was assumed that a typical home located in the area of Baltimore, Maryland, has 16.7 square meters of windows and 3.7 square meters of glazed patio doors, all 20.4 square meters being single glazed. A garage is assumed to be located on the west side of the house, the exterior glass area being distributed on the remaining three sides as follows: north facing, 7.1 m²; south facing, 8.3 m²; east facing, 5.0 m². Draperies are used on 70% of the glass area and shading on 20%. A computerized study was then made to show the energy savings resulting from adhering, to the inside of all glass surfaces, (1) the protectively coated face of a conventional solar energy control sheet and (2) the polyester film face of the solar energy control sheet of this Example 2. Results are tabulated below:

TABLE I

| | Energy Savings Obtainable With Solar Energy Control Sheets | | | |
|---|---|---|---|---|
| | Conventional Solar Energy Control Sheet | | Solar Energy Control Sheet of Example 2 | |
| Type of Energy Required | Load Reduction, Kilowatt Hours | Equivalent Source Energy Saved | Load Reduction, Kilowatt Hours | Equivalent Source Energy Saved |
| Cooling | 2,344 | 400 kg of coal | 2,344 | 400 kg of coal |
| Heating | 141 | 19.7 liters of fuel oil or 20.0 m³ of natural gas | 2,315 | 326 liters of fuel oil or 330 m³ of natural gas |

If the polypropylene face of the solar energy control sheet of Example 2 is adhered to the inside of all glass surfaces, performance is essentially the same as for conventional solar energy control sheets, dramatically illustrating the significance of confronting the inside of the home with an infra-red transmissive layer.

The remarkable winter energy saving resulting from use of the present invention is readily apparent.

EXAMPLE 3

Example 2 was repeated except that the tacky acrylate adhesive was replaced with soluble tack-free polyester laminating adhesive made by copolymerizing 48 moles terephthalic acid, 20 moles isophthalic acid, 32 moles sebacic acid, 40 moles neopentyl glycol and 60 moles ethylene glycol. Bonding was accomplished by laminating between squeeze rolls heated to approximately 75° C. The normal emittance of the resultant structure was found to be 0.25.

The solar energy control sheet of this Example 3 was further processed to make it capable of adhering to a windowpane. First, to the exposed polyethylene terephthalate surface there was applied a solution of a polyester resin containing, based on solids, 7.5 parts benzophenone UV absorber, and the solvent evaporated to leave about 5.4 grams of solids per square meter; the soluble polyester was made by polymerizing 46 moles terephthalic acid, 42 moles isophthalic acid, 12 moles sebacic-azelaic acid, 60 moles ethylene glycol and 40 moles neopentyl glycol. Next a solution of a 95:5 isooctyl acrylate:acrylamide copolymer was applied and the solvent evaporated to leave a layer of normally tacky and pressure-sensitive adhesive weighing 2.7 g/m². An aqueous solution of methyl cellulose was applied over the pressure-sensitive adhesive and the water evaporated to render the surface tack-free but water-activatable for application to a windowpane. When analyzed in accordance with the previously discussed computerized study, the performance of this solar energy control sheet was shown to be similar to that of Example 2.

EXAMPLE 4

Example 3 was repeated, substituting for the polypropylene a 16.5-micrometer foil of polyacrylonitrile having an infra-red transmission value of 0.88. The normal emittance of the resultant laminate was 0.30. Energy-saving performance was calculated to be slightly below that of the films of Examples 2 and 3.

To demonstrate the effect of the insulative, or "R", value of solar energy control sheets which include both a transparent-reflective metal layer and a protective polymer layer of varying transparency to infra-red rays, attention is directed to the following table, which incorporates calculated values:

TABLE II

Insulative Effect of Infra-Red Transmission Properties of Protective Polymer Foils

| Infra-red transmission of room-confronting face | Resistance to radiation transfer, or "R" value, °C. hr m²/kcal | R, °C. hr m²/kcal compared to best prior art solar energy control sheet |
| --- | --- | --- |
| 0 | ↑ | 0.225 |
| 0.10 | ↑ | 0.228 |
| 0.20 | ↑ | 0.232 |
| 0.30 | ↑ | 0.246 |
| 0.40 | ↑ | 0.261 |
| 0.50 | (prior art commercial products) | 0.295 |
| 0.60 | | 0.332 |
| 0.70 | | 0.406 |
| 0.80 | (present invention) | 0.533 0.201 |
| 0.85 | ↓ | 0.636 0.304 |
| 0.90 | ↓ | 0.828 0.496 |
| 0.95 | ↓ | 1.189 0.857 |
| 1.00 | ↓ | 2.255 1.923 |

It will be apparent that any of the conventional modifications of energy control sheets may also be incorporated in sheets of the present invention. For example, visible light transmission can be enhanced by applying a quarter wave length coating of high refractive index material to either or both sides of the metalized layer. Colored layers may be incorporated to achieve specific desired visual effects, etc. Although the abrasion resistance of the exposed polyalkylene metal-protecting layer exceeds that of the exposed polyester foil in prior art constructions, various coatings can be applied to the room-confronting face to further enhance abrasion resistance and facilitate cleaning. Such layers must, however, be either extremely thin, formed of a substance which is inherently highly transparent to infra-red radiation or both.

What is claimed is:

1. In a window unit located in the external wall of a room, said unit comprising a plurality of transparent strata and including at least
    (a) a glazing unit having an inside face oriented toward the interior of the room and an outside face oriented toward the exterior of the room, said glazing unit comprising at least one rigid transparent stratum whose inner face coincides with the inside face of the glazing unit, and
    (b) a flexible, transparent energy control stratum which is located adjacent to said glazing unit or one of its component strata and which is a flexible, unitary multi-layer sheet material comprising a transparent-reflective metal layer bonded to a transparent polymeric support foil which has low transmission and high absorption properties with respect to infra-red energy in the 4–40 micrometer wave length, said metal layer being covered by a transparent polymeric protective layer and having a sheet resistance of less than 20 ohms/square, the improvement wherein (1) the transparent polymeric layer is selected from polymers which, in thicknesses on the order of 5–50 micrometers, transmit at least about 80% of the normal room temperature infra-red radiant energy in the wavelength of 4–40 micrometers, and (2) the energy control stratum is located other than adjacent the outside face of the glazing unit and is oriented so that the protective layer confronts an air space and does not contact any surface of the glazing unit, whereby said window unit not only effectively excludes externally originating heat and glare in hot weather but also returns to the room at least about 55% of the internally originating infra-red energy impinging on said window unit and thereby significantly improves the insulative effectiveness of said window unit in cold weather.

2. The window unit of claim 1 wherein the transparent protective layer is on the order of 10–50 micrometers thick.

3. The window unit of claim 2 wherein the polymeric support foil of the transparent energy control stratum is adhered to the glazing unit.

4. The window unit of claim 3 wherein the protective layer comprises polyethylene.

5. The window unit of claim 3 wherein the protective layer comprises polypropylene.

6. The window unit of claim 3 wherein the protective layer is polyacrylonitrile.

7. A thin, flexible, self-sustaining transparent reflective sheet material for making the energy control stratum in the window unit of claim 1, said sheet material comprising in laminar combination:
    (a) a self-sustaining flexible, transparent biaxially oriented polyethylene terephthalate foil having first and second faces,
    (b) a transparent-reflective metal layer adhered to the first face of said polyethylene terephthalate foil, and
    (c) protectively covering said metal layer, a flexible, transparent layer of a polymeric material which, in thicknesses of 5–50 micrometers, transmits at least about 80% of infra-red radiant energy in the wavelength of 4–40 micrometers.

8. The sheet material of claim 7 wherein the polymeric protective layer is a preformed foil of polyethylene, polypropylene or polyacrylonitrile, said preformed foil being about 10 micrometers thick and adherently bonded over said metal layer by an extremely thin layer of adhesive.

9. The sheet material of claim 8 wherein said preformed foil is polyethylene.

10. The sheet material of claim 8 wherein said preformed foil is polypropylene.

11. The sheet material of claim 8 wherein said preformed foil is polyacrylonitrile.

12. The sheet material of claim 7 wherein a transparent adhesive layer is bonded over the second face of said polyethylene terephthalate foil.

* * * * *

UNITED STATES PATENT AND TRADEMARK OFFICE
CERTIFICATE OF CORRECTION

PATENT NO. : 4,226,910
DATED : October 7, 1980
INVENTOR(S) : Richard R. Dahlen, Richard L. Hansen and Richard L. Weiher It is certified that error appears in the above-identified patent and that said Letters Patent are hereby corrected as shown below:

Col. 4, line 4, "porion" should be -- portion --.

Col. 6, line 16, after "employed;" delete -- at least --;

line 19, after "return" insert -- at least --.

Signed and Sealed this

Twenty-seventh Day of January 1981

[SEAL]

Attest:

RENE D. TEGTMEYER

Attesting Officer

Acting Commissioner of Patents and Trademarks